(12) United States Patent
Ripper et al.

(10) Patent No.: US 7,571,603 B2
(45) Date of Patent: Aug. 11, 2009

(54) METERING SYSTEM FOR REDUCING POLLUTANTS IN MOTOR VEHICLE EXHAUST GASES

(75) Inventors: Wolfgang Ripper, Stuttgart (DE); Johannes Schaller, Vaihingen An der Enz (DE); Markus Buerglin, Ditzingen (DE); Ulrich Meingast, Stuttgart (DE); Dirk Heilig, Ditzingen (DE)

(73) Assignee: Robert Bosch GmbH, Stuttgart (DE)

( * ) Notice: Subject to any disclaimer, the term of this patent is extended or adjusted under 35 U.S.C. 154(b) by 154 days.

(21) Appl. No.: 11/576,192

(22) PCT Filed: Sep. 9, 2005

(86) PCT No.: PCT/EP2005/054502

§ 371 (c)(1),
(2), (4) Date: Mar. 28, 2007

(87) PCT Pub. No.: WO2006/037710

PCT Pub. Date: Apr. 13, 2006

(65) Prior Publication Data

US 2008/0092527 A1  Apr. 24, 2008

(30) Foreign Application Priority Data

Oct. 2, 2004  (DE) ...................... 10 2004 048 075

(51) Int. Cl.
*F01N 3/00* (2006.01)
(52) U.S. Cl. .............................. 60/286; 60/295; 60/297; 60/303; 239/89; 239/91; 239/92; 239/132.3; 239/411; 239/416.4; 239/585.5; 222/145.5; 222/145.6

(58) Field of Classification Search ............... 60/286, 60/295, 297, 301, 303; 239/88, 89, 90, 91, 239/92, 132, 132.3, 410, 411, 416.4, 585.1, 239/585.5; 222/145.5, 145.6
See application file for complete search history.

(56) References Cited

U.S. PATENT DOCUMENTS

| 4,288,037 | A |   | 9/1981 | Schelhas |          |
|-----------|---|---|--------|----------|----------|
| 5,605,042 | A | * | 2/1997 | Stutzenberger | 60/286 |
| 6,192,677 | B1| * | 2/2001 | Tost | 60/286 |
| 6,539,708 | B1| * | 4/2003 | Hofmann et al. | 60/286 |
| 6,848,251 | B2| * | 2/2005 | Ripper et al. | 60/286 |
| 7,100,366 | B2| * | 9/2006 | Hager et al. | 60/286 |
| 2003/0033799 | A1 | | 2/2003 | Scheying | |

FOREIGN PATENT DOCUMENTS

DE  29 00 847 A1  7/1980
DE  101 39 142 A1  2/2003

* cited by examiner

*Primary Examiner*—Binh Q. Tran
(74) *Attorney, Agent, or Firm*—Ronald E. Greigg

(57) ABSTRACT

The invention relates to a metering system for injecting pollutant reducing medium into an exhaust system includes a metering pump, and at least one self-opening nozzle for injecting fluidic media into the exhaust gas system. The nozzle is self-opening with a needle chamber, a nozzle needle and a spring chamber with a spring element. The needle chamber and spring chamber are separated by a flexible membrane which prevents fluidic media from escaping from the needle chamber into the spring chamber, and also permits an excess pressure to prevail in the needle chamber in relation to the spring chamber, causing the nozzle needle to be displaced in opposition to a spring force, thus releasing a nozzle opening. The inventive metering system is cost-effective, robust and can also be used at low operating temperatures.

19 Claims, 4 Drawing Sheets

METERING SYSTEM FOR REDUCING POLLUTANTS IN MOTOR VEHICLE EXHAUST GASES

CROSS-REFERENCE TO RELATED APPLICATION

This application is a 35 USC 371 application of PCT/EP 2005/054502 filed on Sep. 9, 2005.

BACKGROUND OF THE INVENTION

1. Field of the Invention

This invention relates to the reduction of pollutants in exhaust gases from internal combustion engines and more particularly to an improved system for metering reducing agents into exhaust gases for reducing pollutants.

2. Description of the Prior Art

An established method for reducing pollutants, particularly for reducing nitrogen oxides in the exhaust gas of internal combustion engines operated with lean mixtures, is reducing the nitrogen oxides by means of suitable chemical reducing agents. It is a feature common to the known methods that fluid (that is, liquid or gaseous), pollutant-reducing media are injected into an exhaust system of an internal combustion engine and there react with the pollutants in the exhaust gases and convert them chemically. A metering system for metering such fluid, pollutant-reducing media is therefore proposed below that can be employed for reducing pollutants in the exhaust gases of motor vehicles.

In what is known as the ammonia-SCR method, especially in the utility vehicle field, ammonia is needed as a reducing agent in the exhaust gas upstream of a corresponding reduction catalytic converter. In current methods, by blowing an aqueous urea-air aerosol into the engine exhaust gas by means of compressed air, the actual reducing agent, ammonia, is released by thermolysis and ensuing catalyzed hydrolysis.

For possible use in passenger cars, however, because of its high system complexity (costs, installation space, compressed air supply), this method with blown-in compressed air cannot be considered very appropriate for the market.

A further method for avoiding the dependency on compressed air provides for injecting a urea solution (AdBlue) into the engine exhaust gases. For that purpose, pumps and self-preparing valves are for instance used for feeding pressure to the AdBlue.

In this respect, valves are often used of the kind known from gasoline injection, which have various disadvantages. In these valves, the necessity of cooling the (usually electrical) valves that are mounted on the hot exhaust system, presents difficulties. Moreover, the winter functioning of such systems must be considered problematic. At temperatures below −11° C., the conventional urea-water solution freezes and expands. Hence to attain winter functioning of such valves and other system components affected (pumps, pressure regulation, and so forth), considerable engineering effort that accordingly increases the system complexity must be tolerated (for instance, ice-pressure-proof construction, reaspirating pumps, and so forth).

In German Patent DE 196 46 643 C1, a system for nitrogen oxide reducing agent injection into an exhaust gas flow is described. The reducing agent is injected controllably into the exhaust gas flow in the form of fine streams through a plurality of fine nozzle openings, by means of local, clocked overpressure generation. As the nozzles, piezoelectrically controlled nozzles are used, similar to the nozzles in piezoelectric ink jet print heads or nozzles with clocked heating resistor elements, similar to known bubble jet ink jet print heads. The assembly described in DE 196 46 643 C1, however, is complicated in terms of equipment, vulnerable to malfunction especially with regard to the aggressive fluids involved, and expensive.

SUMMARY OF THE INVENTION

A metering system for metering fluid, pollutant-reducing media, in particular aqueous urea solutions, is therefore proposed in which at least one metering pump is used. The metering is meant to be done into a motor vehicle exhaust system which can in particular have a catalytic converter.

The metering system has at least one supply container for storing at least one fluid, pollutant-reducing medium. This fluid, pollutant-reducing medium may for instance be an aqueous urea solution. Furthermore, the metering system has at least one metering pump, communicating with the at least one supply container, and this connection can be made directly or via a pipeline system. The task of the metering pump is in particular to transport the at least one fluid, pollutant-reducing medium at a predetermined pressure and/or at a predetermined volumetric flow rate.

In contrast to conventional systems, usually equipped with simple diaphragm pumps, a metering pump is understood to be a pump for delivering a fluid in which the volumetric flow rate delivered is adjustable with a predetermined precision. However, it may also be understood as a pump which transports a certain volume, and the volume to be transported is meant to be adjustable with a predetermined precision. A metering pump can also be understood to be a pump in which the delivery of the fluid is done at a predetermined pressure, and the pressure is adjustable for instance with a predetermined precision.

The metering system furthermore has at least one self-opening nozzle, communicating with the at least one metering pump directly or via a pipeline system. This at least one self-opening nozzle has at least one supply opening for the delivery of fluid media and also has at least one nozzle opening, which is embodied such that through the nozzle opening, fluid media can be injected into the motor vehicle exhaust system.

The term "self-opening nozzle" is understood to be a nozzle which is closed as long as the pressure of the delivered fluid is below a predetermined minimum pressure. If the pressure of the fluid conversely reaches or exceeds the minimum pressure, then the nozzle opens and meters fluid into the exhaust system of the motor vehicle.

The at least one self-opening nozzle can in particular be embodied such that it has a nozzle body which in turn has a spring chamber and a needle chamber. The needle chamber should have at least one supply opening for delivering fluid media and at least one nozzle opening.

Moreover, at least one nozzle needle should be let into the needle chamber, the nozzle needle being movably and/or rotatably supported, and the nozzle needle, in at least one position and/or orientation, tightly closes the at least one nozzle opening for fluid media and, in at least one further position and/or orientation, opens the nozzle opening for fluid media.

Moreover, at least one spring element should be let into the needle chamber, which spring element exerts a force and/or a torque on the at least one nozzle needle. Without the action of additional forces and/or torques on the at least one nozzle needle, the nozzle needle should tightly close the nozzle opening for fluid media. The spring element thus functions in such a way that in the normal states the at least one nozzle opening is closed.

Advantageously, a fluid medium entering the at least one needle chamber at a pressure $p_1$ exerts a force and/or torque on the at least one nozzle needle that counteracts the force or torque of the at least one spring element. If this pressure $p_1$ exceeds a predetermined minimum pressure $p_{min}$ (which is composed for instance of the atmospheric pressure $p_2$ prevailing in the spring chamber and the force exerted by the at least one spring element), then the at least one nozzle opening for fluid media should be opened.

Moreover, the self-opening nozzle should have at least one sealing element, which prevents or reduces a penetration of fluid media from the at least one needle chamber into the at least one spring chamber. Advantageously, this at least one sealing element is embodied as entirely or partly flexible and connects the at least one spring element and/or the at least one nozzle needle flexibly to the nozzle body.

This can be done in particular by providing that the at least one sealing element has at least one flexible diaphragm. A flexible diaphragm is understood to be a flat, flexible body whose lateral extent exceeds its extent in a dimension perpendicular to it greatly (by a factor 10 or more, for instance), such as a flexible disk. The diaphragm need not be closed but instead can in particular have one or more holes or bores. Thus the diaphragm can be embodied for instance as a thin circular-annular disk, which completely or partly fills up the interstice between the nozzle body and the nozzle needle, and sealing between the spring chamber and the needle chamber should be assured.

Advantageously, the pipeline system and/or the at least one metering pump and/or the at least one self-opening nozzle is embodied as being heatable entirely or in part by means of at least one heating element. This at least one heating element can be controlled for instance by means of an electronic control unit, and this control unit may for instance be equipped with a corresponding temperature sensor. In this way, icing up of the metering system at low operating temperatures, particularly, can be avoided. If the metering system is frozen, the temperature sensor can continue to be used for controlling a thawing process.

The metering system can furthermore additionally have at least one ventilation valve, which is embodied such that it can control the inflow of air and/or protective gas into the at least one metering pump and/or the at least one self-opening nozzle. The metering pump can either aspirate air and/or protective gas itself and thus can evacuate the metering valve, or it can be supplied with protective gas and/or air that is already under pressure, so that the metering pump and the metering valve are blown clear. This embodiment in particular increases the freezing resistance of the metering system.

The at least one pump and the at least one self-opening nozzle are preferably embodied as ice-pressure-proof. If that is not possible, or if for other reasons operation at low temperatures is necessary, then the possibility exists, via the at least one ventilation valve, which can for instance be disposed upstream of the at least one pump, of feeding air into the at least one pump and/or the at least one self-opening nozzle when the vehicle engine is shut off. The slight residual amount of fluid in the pump and/or nozzle can be evacuated, for instance into the exhaust system. The quantity to be expected here can be considered uncritical and can be detected for instance by a control unit and buffer-stored and incorporated, the next time the vehicle engine is started, into a further calculation of the quantity of fluid to be metered. In that case, in particular the at least one metering pump should be designed such that it can generate a pressure to the self-opening nozzle even with air or protective gas as the medium.

The metering system is in particular advantageously embodied such that it has at least one electronic control unit. This control unit can in particular trigger the at least one metering pump and/or the at least one ventilation valve and/or the at least one heating element. This electronic control unit is ideally an already existing control unit, such as the engine control unit (ECU) that is present in nearly all motor vehicles. However, special metering control units are optionally conceivable as well.

In particular, the metering system can also be embodied such that at one or more places in the metering system, a temperature and/or a pressure of the at least one fluid, pollutant-reducing medium is detected with the aid of one or more sensors. This information can be used for instance to optimize the control of the at least one metering pump, the at least one ventilation valve, or the at least one heating element on the part of the at least one electronic control unit.

BRIEF DESCRIPTION OF THE DRAWINGS

The invention is described more fully herein below, in conjunction with the drawings, in which.

DESCRIPTION OF THE PREFERRED EMBODIMENTS

Figure 1:
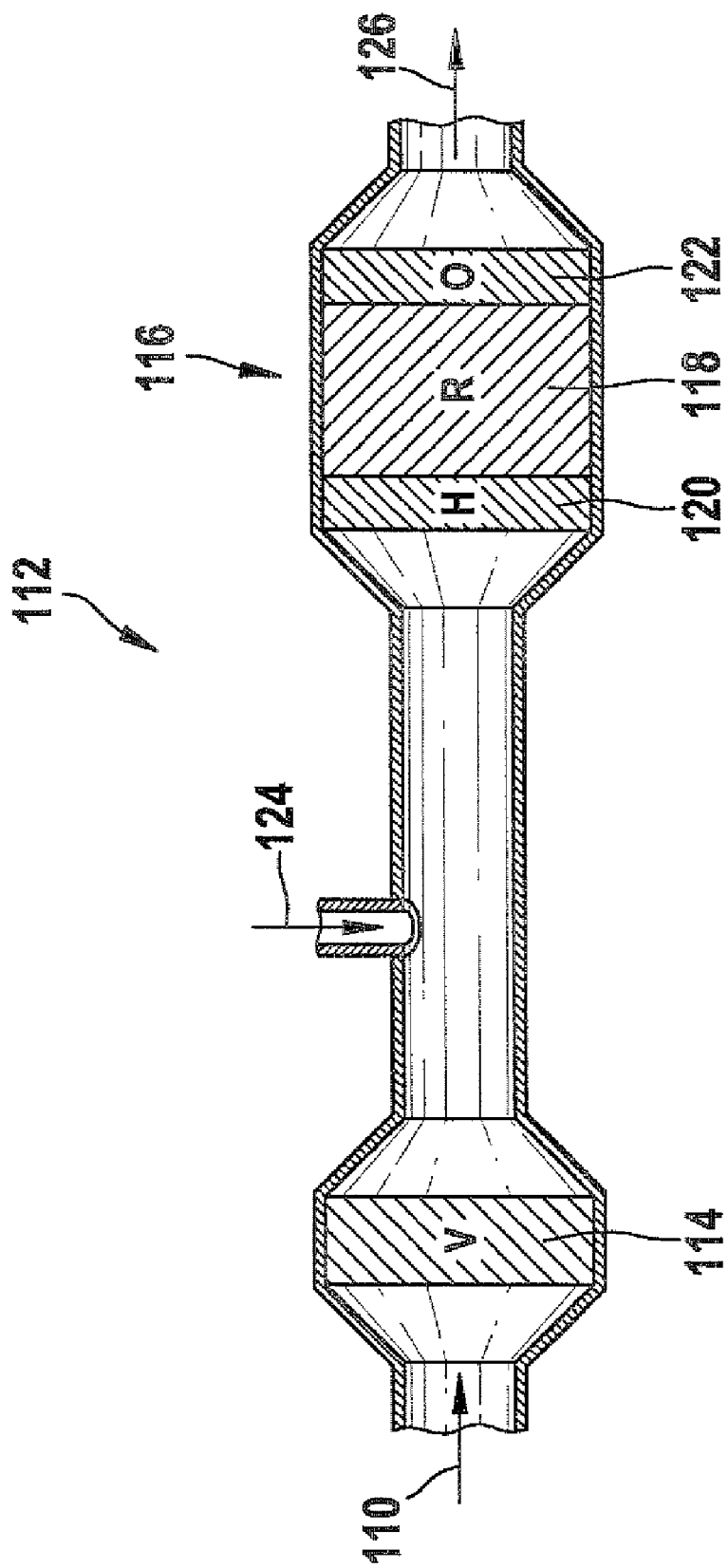
FIG. 1 is a sectional view schematically showing one example of a known system for selective catalytic reduction (SCR) in utility vehicles.

In FIG. 1, as an example, a system for selective catalytic reduction (SCR) is shown, of the kind that is of interest particularly in the utility vehicle field. In this example, exhaust gases 110 from an internal combustion engine are introduced into a 2-stage catalytic converter 112. The 2-stage catalytic converter 112 has a precatalytic converter 114 and a main catalytic converter 116. The latter in turn has a reduction catalytic converter 118, a hydrolysis catalytic converter 120, and an oxidation catalytic converter 122. The reducing agent 124 is introduced, for instance with air reinforcement, into the exhaust system upstream of the reduction catalytic converter 118. This aqueous aerosol 124 is decomposed by thermolysis and ensuing catalyzed hydrolysis and forms the actual reducing agent, that is, ammonia, which in turn reacts with the nitrogen oxides in the engine exhaust gases 110 and converts them into nitrogen-oxide-reduced exhaust gases 126. The use of the SCR process, however, is not limited to the type of catalytic converter shown in FIG. 1; still other versions of catalytic converters can also be used. For instance, the catalytic converters 114, 120 and 122 are not absolutely required.

Figure 2:
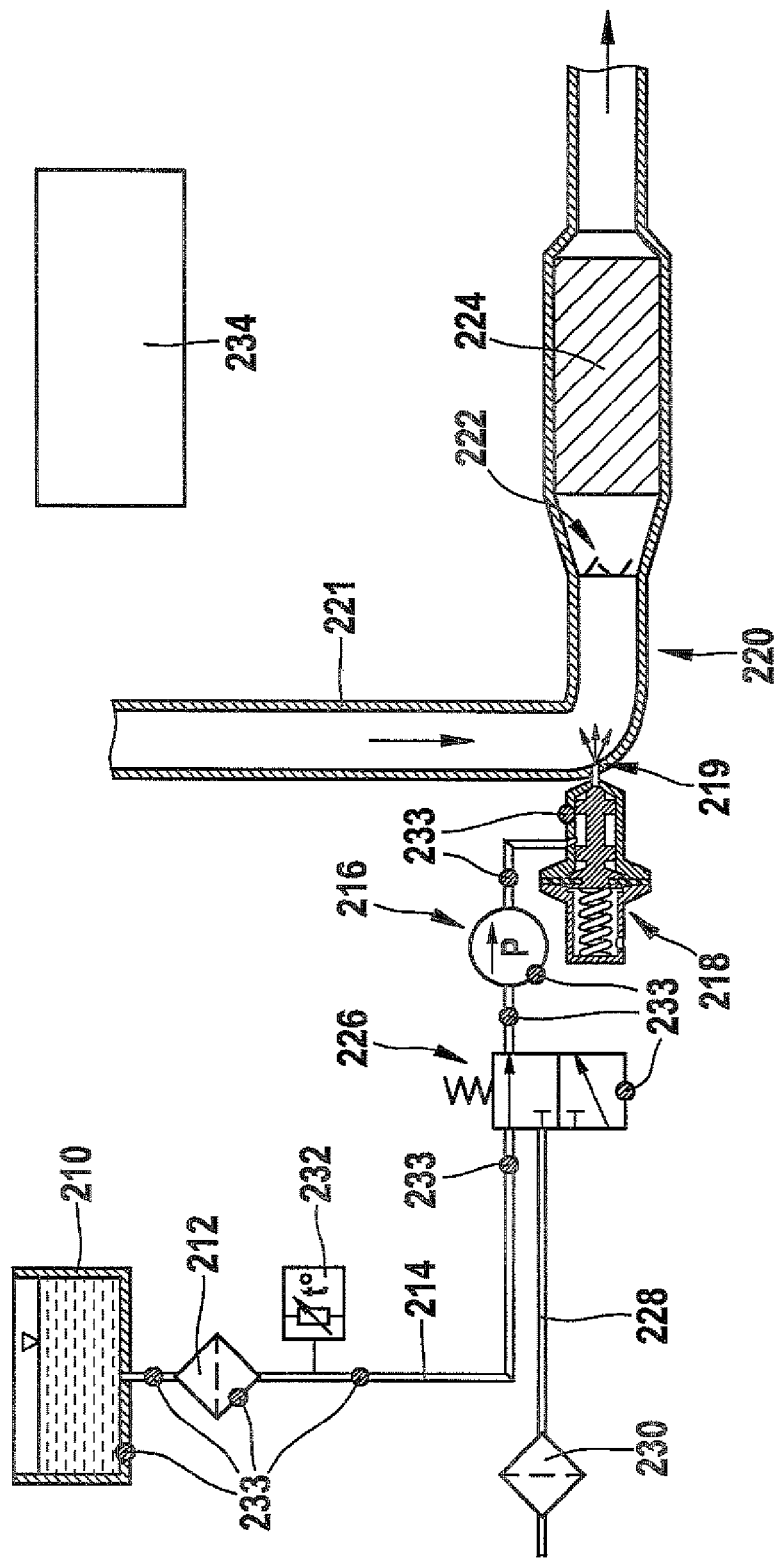
FIG. 2, a metering system of the invention, with a metering pump and a self-opening nozzle.

In FIG. 2, a metering system of the invention is shown for metering fluid, pollutant-reducing media by means of a metering pump 216 and a nozzle unit 218. In this example, a urea-water solution (AdBlue) is used, which is stored in a suitable supply tank 210. The supply tank 210 communicates, via a filter 212 and a pipeline system 214, with the metering pump 216. The filter 212 serves in particular to prevent the penetration of particles from the supply tank 210 into the metering pump 216 and/or the nozzle unit 218.

A self-opening nozzle unit 218 is integrated directly into the metering pump 216; it opens at a defined pressure and sprays the required quantity of urea at the injection point 219 and into an exhaust system 220. As shown in FIG. 2, in this exemplary embodiment the exhaust system 220 has an exhaust gas tube 221, a static mixer 222, and a catalytic converter 224.

This spraying in is optimized with regard to the spray pattern and the droplet size such that it is optimally adapted to the injection point 219. Alternatively, a variant with one or more cordlike streams is also conceivable, in which the at least one cordlike stream in the exhaust system 220 is aimed at an impact plate or impact body (not shown in FIG. 2) and is thereby distributed accordingly.

Directly upstream of the metering pump 216, a ventilation valve 226 is let into the pipeline system 214, and by way of it the metering pump 216 and the nozzle unit 218 can be filled with air via an air-carrying system 228 and an air filter 230. Particularly upon shutoff of the engine at low ambient temperatures, this provides effective protection against freezing damage to the metering system.

In addition, the pipeline system 214, the ventilation valve 226, the metering pump 216, and the nozzle unit 218 are designed to be heatable. The temperature of the urea solution in the pipeline system 214 is optionally monitored by one or more temperature sensors 232, which can be utilized for instance for computer correction of the flow rate and thus to compensate for temperature-caused fluctuations in density. The temperature sensors 232 can be disposed at various places in the system. Various heating elements 233 (shown schematically in FIG. 2) can selectively also be disposed at various places in the system, especially at the supply tank 210, the filter 212, the ventilation valve 226, the metering pump 216, the metering valve 218, and between them at various points in the pipeline system 214; these heating elements can be used both for regulating the temperature and for thawing the system if the ambient temperatures are low.

Various pressure sensors are also disposed in the pipeline system 214 and in the metering pump 216 and can be read off and monitored entirely or partly electronically. For instance, a pressure sensor can be disposed between the metering pump 216 and the nozzle unit 218, and its measurement data can contribute to improving the flow rate calculation and to monitoring the system.

The metering system shown is monitored and controlled constantly by the engine control unit 234 during operation of the engine. Hence the engine control unit 234 constantly evaluates all the pressure and temperature signals, controls the pumping power of the metering pump 216, and controls the activity of the ventilation valve 226. A heating system (not shown in FIG. 2) can also be employed and controlled by the engine control unit 234, for instance in order to prevent freezing of the pipeline system 214 at low ambient temperatures.

The metering system shown in FIG. 2 has a number of decisive advantages over conventional systems. Hence, because instead of a diaphragm pump and a metering valve, for instance, the more-economical components, that is, the metering pump 216 and the self-opening nozzle unit 218, are used, the metering system can be manufactured economically.

The described metering system can furthermore be manufactured with a small structural size. This in particular makes it possible to use it in passenger cars as well. Conversely, because of their great structural size, typical systems until now could usually be used only in trucks. Nor is it necessary to supply compressed air, which further reduces the structural size of the system.

The metering system described furthermore has considerably reduced vulnerability to malfunctions compared with conventional systems, especially even at low temperatures. This is assured in particular by the possibility of ventilation by means of the ventilation valve 226 and the possibility of heating of the metering system.

Figure 3:
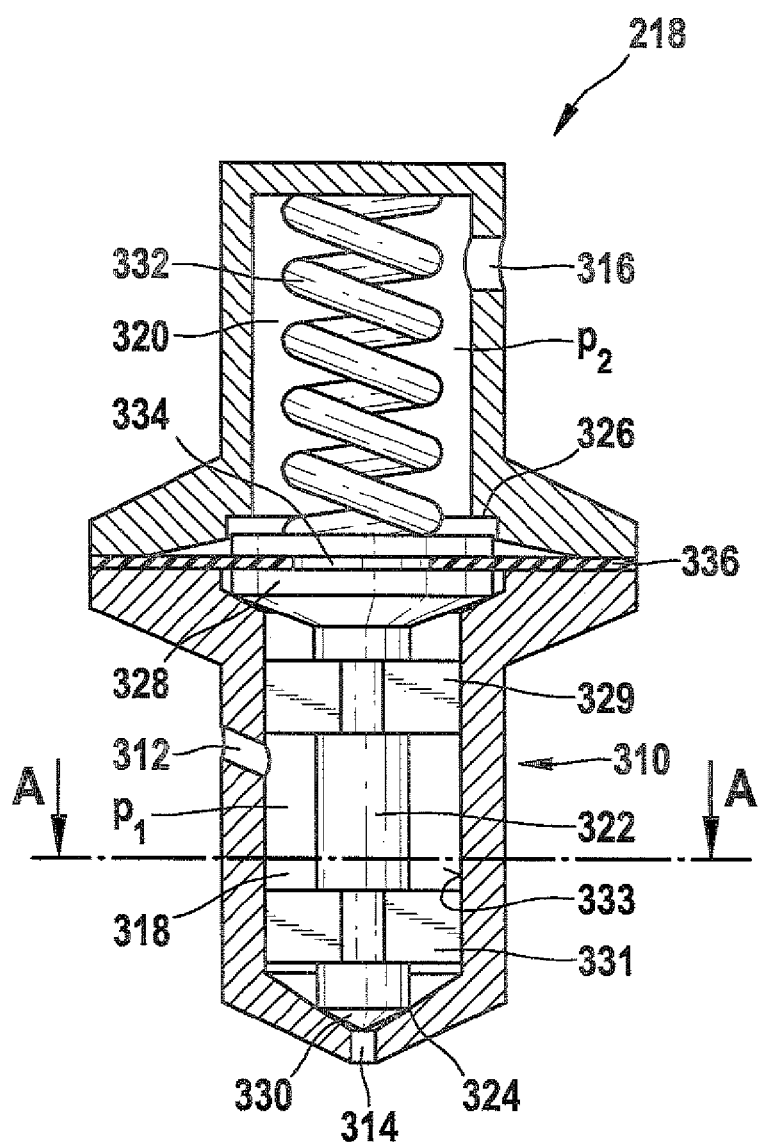
FIG. 3, a self-opening nozzle of the invention, for injecting fluid, pollutant-reducing media into an exhaust system.

In FIG. 3, the integrated nozzle unit 218 is shown in detail. The nozzle unit 218 has a nozzle body 310, which is provided with a supply opening 312 for the urea solution, a nozzle opening 314, and a pressure relief opening 316. The interior of the nozzle body 310 is subdivided into a needle chamber 318 and a spring chamber 320.

In the needle chamber 318, a nozzle needle 322 is supported vertically movably. It can move up and down within a predetermined region. This region of upward and downward motion of the nozzle needle 322 is defined at the bottom by the conical tip 330 of the nozzle needle 322 and a conical stop 324 and at the top by the stop die 328 and the stop 326. The nozzle needle 322 is guided in the needle chamber 318 by the guide elements 329 and 331, which can slide along the inner surface 333 of the needle chamber 318 either without play or with slight mechanical play. On its lower end, the nozzle needle 322 is provided with a conical tip 330, which in the lower position (in terms of FIG. 3) of the nozzle needle lightly closes the nozzle opening 314.

A spiral spring 332 is vertically supported in the spring chamber 320 and exerts a pressure force on the nozzle needle 322, so that (without subjection to pressure from the fluid) the nozzle needle 322 is pressed against the lower stop 324, and as a result the nozzle opening 314 is closed. In its stop die 328, the nozzle needle 322 has an annular groove 334. A circular-annular elastomer diaphragm 336 is let into the groove 334; it connects the nozzle needle 322 elastically to the nozzle body 310 and closes off the needle chamber 318 tightly against the spring chamber 320.

The annular elastomer diaphragm 336 prevents urea solution from the needle chamber from being able to penetrate the spring chamber 320 (leakage flow). Thus the nozzle 218 requires no return line with which a leak quantity would have to be returned. Moreover, the annular elastomer diaphragm 336 has the effect that a pressure difference ($p_1$-$p_0$) can build up between the needle chamber 318 and the spring chamber 320. Through the pressure relief opening 316, it is assured that atmospheric pressure always prevails in the spring chamber 320.

Alternatively, the pressure relief opening 316 can also be subjected to exhaust gas pressure, for instance by means of a tube. In particular, this may be the pressure in the exhaust system 220 in the vicinity of the injection point 219. This refinement offers the advantage of improved constancy of the metering quantity.

In the injection event, the metering pump 216 pumps urea solution through the supply opening 312 into the needle chamber 318, and as a result a pressure $p_1$ can build up in the needle chamber 318. As soon as a predetermined opening pressure, which is determined by the spring force of the spiral spring 332 and by the pressure $p_2$ in the spring chamber 320, is reached and exceeded, the nozzle needle 322 opens; that is, the nozzle needle 322 moves from the lower position shown in FIG. 3 upward until the stop die 328 reaches the upper stop face 326. This stroke is sufficient for opening a required flow cross section between the nozzle needle 322 and the injection opening 314, so that urea solution is injected into the exhaust system 220.

Toward the end of the injection event, as a consequence of corresponding triggering of the metering pump 216 by the engine control unit 234, the pressure $p_1$ correspondingly drops back below the opening pressure again. The nozzle needle 322 moves back into its lower position, in which it tightly closes the nozzle opening 314 again.

Figure 4:
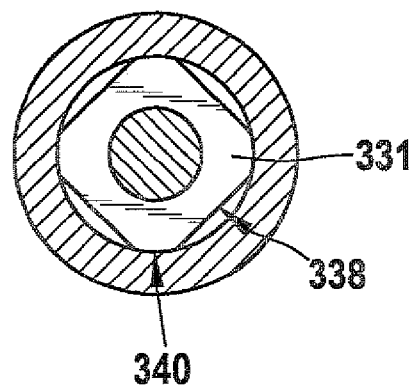
FIG. 4, a sectional view of a first variant embodiment of the self-opening nozzle of FIG. 3, taken along a section plane A-A in FIG. 3.
Figure 5:
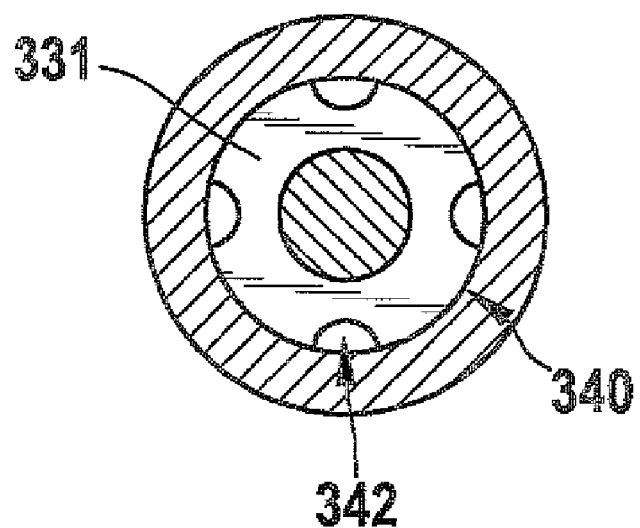
FIG. 5, a sectional view of a second variant embodiment of the self-opening nozzle of FIG. 3, taken along the section plane A-A in FIG. 3.
Figure 6:
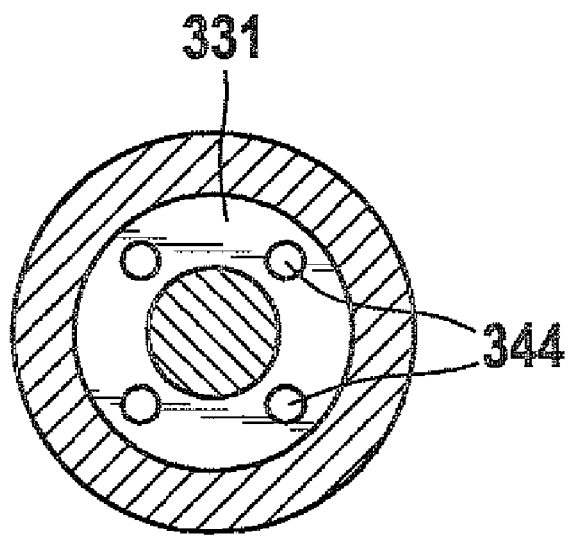
FIG. 6, a sectional view of a third variant embodiment of the self-opening nozzle of FIG. 3, taken along the section plane A-A in FIG. 3.

In each of FIGS. 4 through 6, a respective sectional view is shown of the integrated, self-opening nozzle unit 218 in the plane A-A of FIG. 3; various features of the lower guide element 331 are shown. These features make a loss-free flow of the urea solution possible from the supply opening 312 to the nozzle opening 314.

In the variant shown in FIG. 4, the lower guide element 331 has a circular-annular disk, on whose circumference, distributed equidistantly, four flat faces 338 have been milled, along which faces urea solution can flow downward to the nozzle opening 314. The function of guidance of the nozzle needle 322 is taken on by the remaining, not-flattened guide segments 340.

In the variant shown in FIG. 5, the guide element 331 likewise has a circular-annular disk, but in this case, instead of the flat faces 338, it has four uniformly distributed axial grooves 342. In the exemplary embodiment shown, these grooves have a rounded cross section. Urea solution can flow through these grooves 342 to the nozzle opening 314. Once again, four guide segments 340, which guide the nozzle needle 322, are disposed between the grooves 342.

In FIG. 6, a further variant is shown in which the guide element 331, which again has a circular-annular disk, has four circular bores 344. Urea solution can flow through these four bores 344 to the nozzle opening 314. In this exemplary embodiment, the guidance of the nozzle needle 322 is effective along the entire circumference of the circular-annular disk.

The variant embodiments shown in FIGS. 4 through 6 are merely examples of possible features. One skilled in the art can adopt further structural possibilities. What is decisive in all cases, however, is that urea solution can reach the nozzle opening 314 from the supply opening 312 through a corresponding flow conduit.

The integrated, self-opening nozzle unit 218 described offers numerous advantages, in comparison to conventional systems. For instance, the annular elastomer diaphragm 336, which prevents leakage of the fluid media in the self-opening nozzle unit 218, has the advantage that a return line for the fluid media into the supply container 210 can be dispensed with. This requirement of a return line is a major disadvantage in conventional nozzle systems of the kind that are used for instance in diesel injection into the combustion chamber of an internal combustion engine.

The use of a movable nozzle needle 322, which is prestressed via the spiral spring 332, assures an adequately long stroke for opening the required flow cross section between the nozzle needle 322 and the nozzle opening 314. After the end of the metering operation, or in other words as soon as the metering pump 216 stops furnishing the fluid medium at the predetermined minimum pressure, the self-opening nozzle unit 218 closes again automatically and prevents an unwanted escape or crystallizing out of the pumped fluid medium. Furthermore, and in particular even at high volumetric flow rates, the self-opening nozzle unit 218 can make do without further cooling provisions.

The foregoing relates to a preferred exemplary embodiment of the invention, it being understood that other variants and embodiments thereof are possible within the spirit and scope of the invention, the latter being defined by the appended claims.

The invention claimed is:

1. A metering system for metering fluid, pollutant-reducing media, in particular aqueous urea solutions, into a motor vehicle exhaust system, the system comprising,
   at least one supply container for storing at least one fluid, pollutant-reducing medium,
   at least one metering pump communicating with the at least one supply container, and
   at least one self-opening nozzle, communicating with the at least one metering pump directly or via a pipeline system,
   the self-opening nozzle having at least one supply opening for the delivery of fluid media, and at least one nozzle opening, and
   the at least one nozzle opening being embodied such that through the at least one nozzle opening, fluid media can be injected into the motor vehicle exhaust system, wherein the at least one self-opening nozzle comprises, a nozzle body with a spring chamber and a needle chamber, the needle chamber having at least one supply opening for the delivery of fluid media and at least one nozzle opening and at least one nozzle needle supported movably in the needle chamber in such a way that the at least one nozzle needle, in at least one position, tightly closes the at least one nozzle opening for fluid media and, in at least one further position, opens the nozzle opening for fluid media, at least one spring element in the spring chamber and exerting a force on the at least one nozzle needle, in such a way that without the exertion of additional forces, the at least one nozzle needle tightly closes the at least one nozzle opening for fluid media, and at least one sealing element preventing or reducing a penetration of fluid media from the at least one needle chamber into the at least one spring chamber.

2. The metering system as defined by claim 1, wherein a fluid medium, entering the at least one needle chamber at a pressure p1, exerts a force on the at least one nozzle needle, which force or torque acts counter to the force or torque exerted on the at least one nozzle needle by the at least one spring element, and wherein, if p1 exceeds a predetermined minimum pressure $P_{min}$, the at least one nozzle opening for fluid media is opened.

3. The metering system as defined by claim 1, wherein the at least one sealing element is designed as at least partly flexible, and wherein the at least one sealing element connects at least one of the nozzle needle and the at least one spring element flexibly with the nozzle body.

4. The metering system as defined by claim 2, wherein the at least one sealing element is designed as at least partly flexible and wherein the at least one sealing element connects at least one of the nozzle needle and the at least one spring element flexibly with the nozzle body.

5. The metering system as defined by claim 1, wherein the at least one sealing element has at least one flexible diaphragm.

6. The metering system as defined by claim 2, wherein the at least one sealing element has at least one flexible diaphragm.

7. The metering system as defined by claim 3, wherein the at least one sealing element has at least one flexible diaphragm.

8. The metering system as defined by claim 1, wherein the spring chamber has at least one pressure relief opening.

9. The metering system as defined by claim 2, wherein the spring chamber has at least one pressure relief opening.

10. The metering system as defined by claim 3, wherein the spring chamber has at least one pressure relief opening.

11. The metering system as defined by claim 5, wherein the spring chamber has at least one pressure relief opening.

12. The metering system as defined by claim 8, wherein the at least one pressure relief opening is subjected to atmospheric pressure or to a pressure in the motor vehicle exhaust system.

13. The metering system as defined by claim 9, wherein the at least one pressure relief opening is subjected to atmospheric pressure or to a pressure in the motor vehicle exhaust system.

14. The metering system as defined by claim 10, wherein the at least one pressure relief opening is subjected to atmospheric pressure or to a pressure in the motor vehicle exhaust system.

15. The metering system as defined by claim 11, wherein the at least one pressure relief opening is subjected to atmospheric pressure or to a pressure in the motor vehicle exhaust system.

16. The metering system as defined by claim 1, further comprising at least one ventilation valve embodied such that it is capable of controlling at least one of an inflow of air and protective gas into at least one of the at least one metering pump and the at least one self opening nozzle.

17. The metering system as defined by claim 1, further comprising at least one heating element operable to at least entirely partially heat at least one of the pipeline system, the at least one metering pump and the at least one self opening nozzle.

18. The metering system as defined by claim 1, further comprising at least one electronic control unit for controlling at least one of the at least one metering pump, the at least one ventilation valve and the at least one heating element.

19. The metering system as defined by claim 1, further comprising at least one device for measuring at least one of the temperature and the pressure of the fluid, pollutant-reducing medium.

* * * * *